United States Patent [19]
Cichowski

[11] 3,873,633
[45] Mar. 25, 1975

[54] PROCESSES FOR DEHYDROGENATION OF HYDROCARBONS
[75] Inventor: Robert S. Cichowski, San Luis Obispo, Calif.
[73] Assignee: Phillips Petroleum Company, Bartlesville, Okla.
[22] Filed: July 19, 1973
[21] Appl. No.: 380,590

Related U.S. Application Data
[63] Continuation-in-part of Ser. No. 105,649, Jan. 11, 1971, abandoned.

[52] U.S. Cl. .................. 260/680 E, 260/683.3
[51] Int. Cl. .............................................. C07c 5/18
[58] Field of Search .................... 260/680 E, 683.3

[56] References Cited
UNITED STATES PATENTS
3,274,285  9/1966  Bajars ............................. 260/680
3,321,544  5/1967  Noddings et al. ............... 260/683.3
3,374,283  3/1968  Bajars ............................. 260/680

FOREIGN PATENTS OR APPLICATIONS
949,488  2/1964  United Kingdom ......... 260/680 E Primary Examiner—Paul M. Coughlan, Jr.

[57] ABSTRACT

Organic compounds are dehydrogenated to compounds having a higher degree of unsaturation by contacting the feedstock in the vapor phase in the presence of an oxygen-containing gas with a catalyst comprising cobalt, phosphorus, oxygen, and, optionally, bismuth. Representative of such conversions is the oxidative dehydrogenation of butane to butadiene and isopentane to isoprene in the presence of catalyst comprising bismuth-cobalt-phosphorus-oxygen and cobalt-phosphorus-oxygen, respectively. The conversion products are valuable compounds particularly useful as intermediates for the preparation of polymeric materials such as synthetic rubbers and the like.

12 Claims, No Drawings

PROCESSES FOR DEHYDROGENATION OF HYDROCARBONS

This is a continuation-in-part of application Ser. No. 105,649 filed Jan. 11, 1971, now abandoned.

The present invention relates to chemical compositions and chemical processes. More particularly, the invention relates to catalyst compositions, their preparation, and to catalytic processes employing such compositions, e.g., processes for effecting the dehydrogenation of hydrocarbons.

Dehydrogenation processes for the conversion of organic compounds to compounds having a higher degree of unsaturation include both thermal noncatalytic processes and catalytic processes. The former are characterized by undesirable side reactions, low order of conversion and yields and poor product selectivity. The catalytic processes are generally characterized by the particular catalytic material employed and the conditions under which the processes are operated, e.g., in the absence or presence of oxygen. While a number of such catalytic processes have attained some measure of commercial success, there is a continuing search to develop catalytic materials which are more efficient in minimizing side reactions, inproving conversion rates, improving yields and selectivities to desired end product, have a low susceptibility to deactivation, i.e., are capable of extended periods of operation without regeneration, and can be readily regenerated to an activity approaching that of fresh catalysts. The problem constantly faced by those skilled in the art is the indentification and characterization of the compositions which are highly efficient dehydrogenation catalysts.

A number of catalysts and catalyst systems which include halogens or halogen-releasing compounds have been disclosed. These, however, have exhibited so many disadvantages in regard to equipment corrosion and the additional expense of continuously feeding, recovering and recycling the relatively expensive halogen materials that economically practical, large scale use of such catalytic materials has been precluded. Halogen-free catalysts are the most desirable for use in dehydrogenation processes.

The present invention provides a novel catalyst and a novel process for the conversion of hydrocarbon feedstocks to hydrocarbons having a greater degree of unsaturation and which have the same or lower number of carbon atoms as in the hydrocarbon feed. According to this invention, hydrocarbon feedstock can be converted directly to hydrocarbons having a greater degree of unsaturation by contacting said feedstock under dehydrogenation conditions in the vapor phase in the presence of molecular oxygen with a catalytic material comprising cobalt, phosphorus and oxygen and, optionally, bismuth. Thus, paraffinic hydrocarbons can be converted in good yields to diolefins and/or monoolefins and monoolefins can be converted to diolefins. The invention is particularly suitable for the production of diolefins from paraffins and particularly useful results are obtained by the dehydrogenation of butane to 1,3-butadiene and isopentane to isoprene.

The hydrocarbon feedstocks which are applicable for the oxidative dehydrogenation processes of the present invention comprise dehydrogenatable aliphatic hydrocarbons having from about 3 to 12 carbon atoms per molecule and at least one

grouping. These can be branched or unbranched and include paraffins as well as monoolefins, but paraffins are presently preferred. The conversion of butane and isopentane to 1,3-butadiene and isoprene, respectively, has been found particularly advantageous by the processes of the invention. Some specific examples of other feeds include propane, isobutane, pentane, hexane, 2-methylhexane, octane, 2,4-dimethyloctane, butene-2, 2-methylbutene-1, hexene-2, octene-1, 3-methylnonene-4, dodecene-1, and the like and mixtures thereof.

The novel catalysts of the present invention comprise cobalt associated with phosphorus and, optionally, also associated with bismuth. These elements are not in the elemental state but are combined with sufficient oxygen to form one or more neutral compounds such as cobalt phosphate, bismuth phosphate, cobalt oxide, etc., depending upon the proportions of each element present. In general, the proportions of cobalt, phosphorus, and bismuth will correspond to the expression $Bi_x Co_y P_z$, wherein x, y and z will have values as follows:

|   | Broad  | Preferred |
|---|--------|-----------|
| x | 0–10   | 0.5–3     |
| y | 0.1–10 | 1–3.5     |
| z | 0.1–5  | 0.5–1     |

These catalysts can also be supported on or diluted with conventional catalytic materials such as silica, alumina, boria, magnesia, titania, zirconia, and combinations thereof, as well as other similar conventional materials known in the art.

The catalyst of the present invention can be prepared by any suitable method. Conventional methods such as coprecipitation, impregnation, or dry-mixing can be used. In general, any method can be used which will provide a composition containing the above-described elements in the above-described proportions and which will have a catalytic surface area of at least about 1 $m^2/g$. Thus, a cobalt compound, a phosphorus compound, and a bismuth compound can be combined in any suitable way. Substantially any cobalt, phosphorus, or bismuth compounds can be employed in the preparation of these catalysts so long as none of the compounds are detrimental to the final oxidative dehydrogenation catalyst, and essentially all of the elements in the compounds used, other than the cobalt, phosphorus, or bismuth (if present), are removed from the final catalyst by prior washing or by volatilization. However, small amounts of some other elements involved in the preparation of the catalyst can be tolerated in the final catalytic composition. For example, if alkali metal or alkaline earth metal hydroxides are used in a procedure involving precipitation of cobalt or bismuth, small residual amounts of such metals are not damaging. Similarly, if bismuth sulfate or cobalt sulfate are employed in the preparation, small residual amounts of sulfur can be tolerated.

Generally, however, the preferred cobalt, phosphorus, and bismuth compounds are either the oxides of these elements or compounds convertible to the oxide on calcination. Some examples of these are cobalt nitrate, cobalt acetate, bismuth nitrate, phosphoric acid and the like.

A preferred catalyst preparation method is to boil a solution containing soluble compounds of cobalt, phosphorus, and bismuth (if present) until sufficient water has been removed and the mixture is a viscous, hot, syrupy liquid which solidifies on cooling. This largely dehydrated mixture is then relatively rapidly brought to a high temperature in a furnace. For example, the mixture is heated to 1,000°–1,400° F. over a period not exceeding four hours, preferably not exceeding two hours. This relatively rapid heating to calcination temperature generally cuases a foaming and expansion of the mixture and then a solidification to a very porous and very uniform mass having a low apparent density. After reaching this calcination temperature, the mass is further heated in air at 1,000°–1,400° F. for 1–24 hours.

After this calcination, the catalyst is active for use in oxidative dehydrogenation and can be converted into any desired form or shape such as powder, granules, pellets, and the like.

In an alternative catalyst preparation method, solutions of suitable cobalt and bismuth compounds are coprecipitated by the addition of alkali metal or alkaline earth metal hydroxides. The precipitate is then filtered, washed, dried, then impregnated with a solution of a suitable phosphorus compound such as phosphoric acid. This composite is then activated by calcination in an oxygen-containing gas such as air at a temperature of 900°–1,500° F. for 1–24 hours, or until the catalyst is active for oxidative dehydrogenation.

The hydrocarbon feedstocks can be dehydrogenated according to the process and with the catalyst of the present invention at temperatures in the range from about 800° to about 1,300° F., preferably from about 950° to about 1,200° F., at any convenient pressure such as from about 7 to about 250 psia and at a hydrocarbon:oxygen ratio of from about 1:1 to about 1:4. The presence of steam is frequently beneficial and a steam:hydrocarbon ratio up to about 50:1 can be used. The hydrocarbon feed rate will generally be in the range of from about 50 to about 5,000 GHSV. The fixed catalyst bed is the preferred mode of contact but other modes, such as the fluidized bed, can also be used.

The dehydrogenation processes of this invention are ordinarily carried out by forming a mixture, preferably a preheated mixture, of the hydrocarbon feed, the oxygen-containing gas, and the steam (if used), and passing this mixture over the catalyst at the desired temperature. The effluent from the reaction zone is subjected to any suitable separation method isolate and recover the desired products. Unconverted feeds or partially converted materials can be recycled.

Generally, at least trace amounts of oxygenated products are also formed in these reactions. For example, compounds such as furan, acetaldehyde, furfural, and acetic acid can be obtained. Some carbon oxides will be formed as well as some cracking products. In some instances, butadiene can be formed as a byproduct of the oxidative dehydrogenation of isopentane to isoprene.

The catalyst can operate for long periods without regeneration. However, if and when regeneration is required, this can be accomplished by simply halting the flow of feed hydrocarbons. Contact of the catalyst with the air and steam can be maintained at the elevated temperature until sufficient activity is restored.

The invention can be illustrated by the following examples.

EXAMPLE I

A Co/P/O catalyst, having a Co:p atomic ratio of 3:1, was prepared by mixing 150 ml of a 1 molar solution of cobalt nitrate with 3.5 ml of 85 percent phosphoric acid. The mixture was then boiled on a hot plate with stirring until sufficient dehydration took place to give the mixture a viscous, syrupy consistency. The misture was then heated in a furnace programmed to reach 1,200° F. in 2 hours after which it was maintained at that temperature for 4 more hours. During the calcination, the composition formed and solidified into a low density porous mass. This mass was then cooled and crushed to 20–28 mesh particles.

A portion of the above-prepared catalyst was charged into a tubular fixed bed reactor and tested for the dehydrogenation of isopentane. Isopentane at 1,000 GHSV, diluted with air at 5,000 GHSV and with steam at 10,000 GHSV, was passed over the catalyst at 1,100° F. and at atmospheric pressure. After 15 minutes on stream, the conversion of isopentane was found to be 25.9 percent. The modivity (a modified selectivity based on gas phase products only) to isoprene was 23.3 percent and the modivity to both isoprene and isoamylenes was 30.7 percent.

EXAMPLE II

A Bi/Co/P/O catalyst, having a Bi:Co:P atomic ratio of 1:3:1 was prepared by mixing 150 ml of a 1 molar cobalt nitrate solution, 50 ml of a 1 molar bismuth nitrate solution (it was also 1 molar in $HNO_3$), and 3.5 ml of 85 percent $H_3PO_4$. This mixture was then dehydrated and calcined in the same manner as the catalyst mixutre of Example 1.

A 20–28 mesh portion of this catalyst was then charged into a tubular fixed bed reactor and tested for the oxidative dehydrogenation of butane. Butane at 500 GHSV, diluted with air at 2,400 GHSV and steam at 4,925 GHSV, was passed over the catalyst at 1,200° F. and at atmospheric pressure. After 15 minutes on stream, the conversion was 33 percent. The modivity to butadiene was 32 percent and the modivity to both butadiene and butenes was 44 percent.

EXAMPLE III

A Bi/Co/P/O catalyst, having a Bi:Co:P atomic ration of 1:3:1 was prepared by still another method. A 150 ml quantity of 1 molar nitrate solution and 50 ml of 1 molar bismuth nitrate solution (which was also 1 molar in nitric acid) were slowly and simultaneously added to 200 ml water together with the simultaneous addition of sufficient 10 molar potassium hydroxide to maintain a pH of 8 throughout the addition. The resulting precipitate was then filtered, washed and dried. The solid was crushed to 35 mesh and then impregnated with 3.5 ml of 85 percent $H_3PO_4$, together with sufficient water to make a paste. The mixture was dried under a heat lamp and then calcined 4 hours at 1,100° F.

A 20–28 mesh portion of the catalyst was then charged into a tubular fixed bed reactor. Isopentane at 1,000 GHSV, diluted with air at 5000 GHSV and with steam at 10,000 GHSV, was passed over the catalyst at 1,100° F. and at atmospheric pressure. After 15 minutes on stream, the conversion of isopentane was found to be 21 percent. The modivity to isoprene was 9.5 percent and the modivity to both isoprene and isoamylenes was 39 percent.

EXAMPLE IV

Several additional Bi/Co/P/O catalysts, having varying atomic ratios, were prepared according to the method of Example II. These catalysts were tested for the oxidative dehydrogenation of isopentane as shown below. Run 1 was performed under the following conditions: temperature 1,050° F.; atmospheric pressure; isopentane GHSV, 1,000, air GHSV, 5,000; steam GHSV, 20,000. Runs 2–7 were performed under the following conditions: temperature, 1,100° F.; atmospheric pressure; isopentane GHSV, 1,000; air GHSV, 5,000, steam GHSV, 10,000. Data was recorded after 15 minutes on stream.

TABLE

| Catalyst No. | 1 | 2 | 3 | 4 | 5 | 6 | 7 |
|---|---|---|---|---|---|---|---|
| Bi:Co:P Atomic Ratio | 3:1:1 | 3.5:0.5:1 | 2:2:1 | 0.5:3.5:1 | 1:1:1 | 1:3:2 | 0.5:3.5:2 |
| Conversion, % | 18.1 | 5.3 | 19.6 | 21.0 | 18.7 | 20.2 | 23.0 |
| Modivity to Isoprene, % | 0 | 0 | 17.1 | 28.1 | 20.8 | 27.0 | 24.3 |
| Modivity to Isoprene plus Isoamylenes, % | 25.1 | 24.6 | 17.1 | 28.1 | 20.8 | 27.0 | 24.5 |

The foregoing examples demonstrate the effectiveness of the catalytic materials of the invention in the dehydrogenation of paraffinic feedstocks to olefins and/or diolenfins.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A process for the dehydrogenation of dehydrogenatable paraffinic feedstocks having from 3 to 12 carbon atoms to the corresponding diolefin and/or mono-olefin which comprises contacting said feedstock in the vapor phase in the presence of molecular oxygen and in the absence of halogen under dehydrogenation conditions with a catalyst consisting of bismuth, cobalt and phosphorus in association with oxygen, wherein the proportions of bismuth, cobalt and phosphorus correspond to the expression $Bi_xCo_yP_z$, in which expression the value of x is in the range of 0 to 10, the value of y is in the range of 0.1 to 10 and the value of z is in the range of 0.1 to 5 and wherein the feedstock:oxygen ratio is in the range of about 1:1 to about 1:4.

2. The process of claim 1 wherein the value of x is in the range of 0.5 to 3, the value of y is in the range of 1 to 3.5 and the value of z is in the range of 0.5 to 1.

3. The process of claim 1 wherein said feedstock is butane.

4. The process of claim 1 wherein said feedstock is isopentane.

5. The process of claim 2 wherein said feedstock is butane.

6. The process of claim 2 wherein said feedstock is isopentane.

7. The process of claim 2 wherein the value of $x$ is 1, the value of $y$ is 3 and the value of $z$ is 1.

8. The process of claim 2 wherein the value of $x$ is 3, the value of $y$ is 1 and the value of $z$ is 1.

9. The process of claim 2 wherein the value of $x$ is 0.5, the value of $y$ is 3.5 and the value of $z$ is 1.

10. The process of claim 2 wherein the value of $x$ is 1, the value of $y$ is 3 and the value of $z$ is 2.

11. The process of claim 2 wherein the value of $x$ is 0.5, the value of $y$ is 3.5 and the value of $z$ is 2.

12. The process of claim 1 wherein $x$ is zero, the value of $y$ is 3 and the value of $z$ is 1.

* * * * *